United States Patent
Chan et al.

(10) Patent No.: US 7,106,670 B2
(45) Date of Patent: Sep. 12, 2006

(54) METHOD AND APPARATUS FOR LONG SEEKING CONTROL OF PICKUP HEAD

(75) Inventors: Yi-Chung Chan, Taipei (TW); Kuo-Hua Liao, Taipei (TW)

(73) Assignee: Via Technologies, Inc., Taipei (TW)

( * ) Notice: Subject to any disclaimer, the term of this patent is extended or adjusted under 35 U.S.C. 154(b) by 694 days.

(21) Appl. No.: 10/196,876

(22) Filed: Jul. 16, 2002

(65) Prior Publication Data
US 2003/0099166 A1    May 29, 2003

(30) Foreign Application Priority Data
Nov. 23, 2001    (TW)    ............................. 90129014 A

(51) Int. Cl.
*G11B 7/00*    (2006.01)

(52) U.S. Cl. .................. 369/44.28; 369/30.17; 369/53.1; 369/124.01

(58) Field of Classification Search ............ 369/44.28, 369/44.27, 30.17, 47.1, 44.34, 44.29, 44.35, 369/44.41, 53.1, 59.1, 124.01
See application file for complete search history.

(56) References Cited

U.S. PATENT DOCUMENTS 6,781,929 B1 *    8/2004    Kadlec ................... 369/44.28

* cited by examiner

*Primary Examiner*—Ali Neyzari
(74) *Attorney, Agent, or Firm*—Volpe and Koenig P.C.

(57) ABSTRACT

A method for long seeking control of an optical read/write head is disclosed. The optical read/write head includes a sled moved by a sled motor, and a lens mounted on the sled and moved by a lens actuator, and said method includes steps of determining a velocity profile according to a desired travel distance of the optical read/write head; detecting an instant velocity and an instantaneous position of the optical read/write head at a certain time spot; comparing the instant velocity with a target velocity corresponding to the instantaneous position according to the velocity profile; modifying velocities of the sled and the lens according to the comparing result; and dynamically adjusting a position of the lens in the sled. An apparatus for long seeking control of an optical read/write head is also disclosed.

18 Claims, 5 Drawing Sheets

METHOD AND APPARATUS FOR LONG SEEKING CONTROL OF PICKUP HEAD

FIELD OF THE INVENTION

The present invention relates to a method for long seeking control of a pickup head, and more particularly to a method for long seeking control of an optical read/write head. The present invention also relates to an apparatus for long seeking control of a pickup head.

BACKGROUND OF THE INVENTION

Nowadays, various disk drives such as magnetic and optical disk drives have become standard equipment of computers, and the reading speed thereof is getting higher and higher. Therefore, the seeking operations of the magnetic or optical read/write heads for desired tracks are required to be as quick and precise as possible.

Please refer to FIG. 1 which schematically shows a carriage structure of a typical optical read/write head. The optical read/write head 10 is carried by a sled 11 and further fine tuned by a lens actuator (not shown), e.g. an electromagnetic actuator, to move along a vertical focusing direction F and/or a horizontal tracking direction T. For a quick seeking operation in the tracking direction, the move of the sled and the lens actuator is based on certain velocity profiles which are established according to the desired move distances (track counts) of the optical read/write head 10. In general, each velocity profile includes an acceleration zone 21, a constant zone 22 and a deceleration zone 23, as shown in FIG. 2. The constant zone 22 is possibly absent due to a relatively short travel.

In order to move the optical read/write head according to a velocity profile shown in FIG. 2, a conventional velocity feedback mechanism shown in FIG. 3 is used to dynamically adjust the outputs of the sled motor 31 and the lens actuator 32. In the velocity feedback mechanism, velocity profiles are provided by a velocity profile generator 30. A velocity sensor 33 is provided to detect a relative velocity of the optical read/write head to an optical disk so as to generate a reference signal S1. The reference signal S1 is feedback, in a reverse phase, to the output end of the velocity profile generator 30 to realize a velocity error Verr. The velocity error Verr is provided for a first and a second compensators 35 and 36 which are electrically connected and output a first and a second control signals S2 and S3 to the sled motor 31 and lens actuator 32, respectively, in order to adjust the velocities of the sled and the lens, and approximate the velocity error Verr to zero. Further, a track counter 37 is used in the velocity feedback mechanism to determine the traveled track number that is provided for the reference of the velocity profile generator 30.

Owing to inertia, the lens movably mounted on the sled will shift to the left side when the sled is driven to move rightwards by the sled motor. Afterwards, the lens driven by the lens actuator is likely to shift to the rightmost end because of the quick response of the lens actuator compared to the sled motor. Consequently, it will take plenty of time to center the lens on the sled to have best performance after a long-distance travel along the tracking direction T for long seeking. On the other hand, during the period the lens is biased, the light intensity realized by the optical read/write head is reduced so as to adversely affect the determination of the moving velocity and direction of the optical read/write head. Such effect may lead to a standstill or an overshoot motion of the optical read/write head, and thus render failure in long seeking.

In order to solve the aforementioned problem, another velocity feedback mechanism, as shown in FIG. 4, is suggested to dynamically adjust the outputs of the sled motor 41 and the lens actuator 42. In this velocity feedback mechanism, the velocity error Verr outputted from the velocity sensor 43 is provided for the first compensator 45 only to modify the output of the sled motor 41. On the other hand, a central error CE in lieu of the velocity error Verr is used by the second compensator 46 to modify the output of the lens actuator 42 in order to center the lens on the sled at any time. Under this circumstance, the second compensator 46 and thus the lens actuator 42 contribute little to the compliance of the velocity profile of the optical read/write head with the required velocity profile. In other words, the sled motor 41 plays the role of carrying the optical read/write head to move according to the velocity profile on its own. When the eccentric rate of the optical disk is great to an extent, and the access speed of data is getting higher and higher, the overshoot problem of the sled motor 41 becomes serious so as to render the system unstable.

SUMMARY OF THE INVENTION

Therefore, an object of the present invention is to provide a method for long seeking control of a pickup head, which involves a velocity feedback mechanism to comply with the desired velocity profile and center the lens in an optimal condition.

Another object of the present invention is to provide an apparatus for a long seeking control of a pickup head, which includes two compensators for the lens so as to comply with the desired velocity profile and center the lens in an optimal condition.

A first aspect of the present invention relates to an apparatus for long seeking control of a pickup head. The pickup head is moved relative to an information storage means by a long-distance driving device and a fine-tuning driving device. The apparatus for long seeking control of a pickup head includes a velocity profile generator generating a target velocity signal in response to a pickup head seeking movement; a velocity sensor detecting a velocity of the pickup head to obtain a velocity error signal; a first compensator electrically connected to the long-distance driving device, and outputting a first control signal to the long-distance driving device in response to the velocity error signal to modify a velocity of the pickup head by a first level; a second compensator electrically connected to the fine-tuning driving device, and outputting a second control signal to the fine-tuning driving device in response to the velocity error signal to modify a velocity of the pickup head by a second level; and a third compensator electrically connected to the fine-tuning driving device, and outputting a third control signal to the fine-tuning driving device to corresponding the pickup head to the information storage means in a predetermined manner.

Preferably, the present apparatus is used for long seeking control of an optical read/write head, and the information storage means is a compact disk (CD). The optical read/write head may include a sled carrier moved by the long-distance driving device and a data pickup lens moved by the fine-tuning driving device. The long-distance driving device is generally a motor, and the fine-tuning driving device can be an electromagnetic actuator.

In an embodiment, the velocity error signal is obtained by comparing a detected velocity signal generated by the velocity sensor with the target velocity signal Preferably, the apparatus includes a track counter electrically connected to the velocity profile generator for recording the track count, and generating a counting signal to the velocity profile generator.

Preferably, the predetermined manner is to substantially center the data pickup lens on the sled carrier while encountering with tracks of the information storage means.

In an embodiment, a velocity error value of the velocity error signal is a difference of a detected velocity value of the detected velocity signal and a target velocity value of the target velocity signal, and a combination of the first and the second levels of modification approximates the velocity error value to zero.

Preferably, the apparatus further includes a first amplifier electrically connected to the first compensator and the long-distance driving device for amplifying the first control signal prior to input into the long-distance driving device; and a second amplifier electrically connected to the second and the third compensators and the fine-tuning driving device for amplifying the second and the third control signals prior to input into the fine-tuning driving device.

A second aspect of the present invention relates to an apparatus for long seeking control of a pickup head. The pickup head includes a carrier moved by a long-distance driving device, and a data pickup element mounted on the carrier and moved by a fine-tuning driving device. The apparatus for long seeking control of a pickup head includes a velocity profile generator generating a target velocity signal in response to a pickup head seeking movement; a velocity sensor for detecting a velocity of the pickup head to generate a velocity error signal; a first compensator electrically connected to the fine-tuning driving device, and outputting a first control signal to the fine-tuning driving device in response to the velocity error signal to modify a velocity of the data pickup element; and a second compensator electrically connected to the fine-tuning driving device, and outputting a second control signal to the fine-tuning driving device to substantially center the data pickup element on the carrier. Generally, the present apparatus further includes a third compensator electrically connected to the long-distance driving device, and outputting a third control signal to the long-distance driving device in response to the velocity error signal to modify the velocity of the carrier.

A third aspect of the present invention relates to a method for long seeking control of a pickup head. The pickup head includes a carrier moved by a long-distance driving device, and a data pickup element mounted on the carrier and moved by a fine-tuning driving device. The method includes steps of determining a velocity profile according to a desired travel distance of the pickup head; detecting an instant velocity and an instantaneous position of the pickup head at a certain time spot; comparing the instant velocity with a target velocity corresponding to the instantaneous position according to the velocity profile; and dynamically adjusting a position of the data pickup element in the carrier. Generally, the present method further includes a step of modifying velocities of the carrier and the data pickup element according to the comparing result of the instant velocity and the target velocity.

In an embodiment, the pickup head is an optical read/write head, the carrier is a sled, the data pickup element is a lens, the long-distance driving device is a motor, and the fine-tuning driving device is an electromagnetic actuator.

Preferably, the position of the data pickup element is adjusted by being centered on the carrier.

A fourth aspect of the present invention relates to a method for long seeking control of a pickup head. The pickup head includes a carrier driven by a long-distance driving device, and a data pickup element mounted on the carrier and driven by a fine-tuning driving device to move relative to a data carrying object. The method includes steps of determining a target velocity of the pickup head according to a travel unit number from a start position at a first time spot; detecting an instant velocity of the pickup head at the first time spot; comparing the instant velocity with the target velocity to realize a velocity error; inputting the velocity error and a position error to the fine-tuning driving device to determine a position of the data pickup element at a second time spot. Generally, the present method further includes a step of inputting the velocity error to the long-distance driving device to determine a position of the carrier at the second time spot.

Preferably, the position error is a central error which controls the data pickup element to be centered on the carrier.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
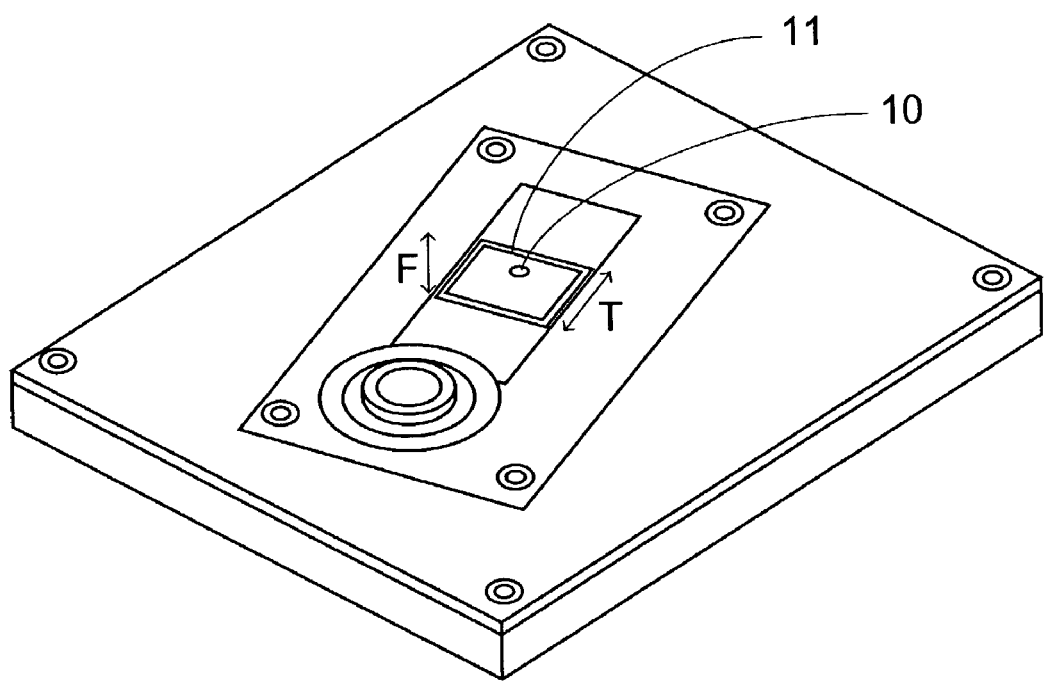
FIG. 1 is a schematic diagram showing a driven structure of a typical optical read/write head.
Figure 2:
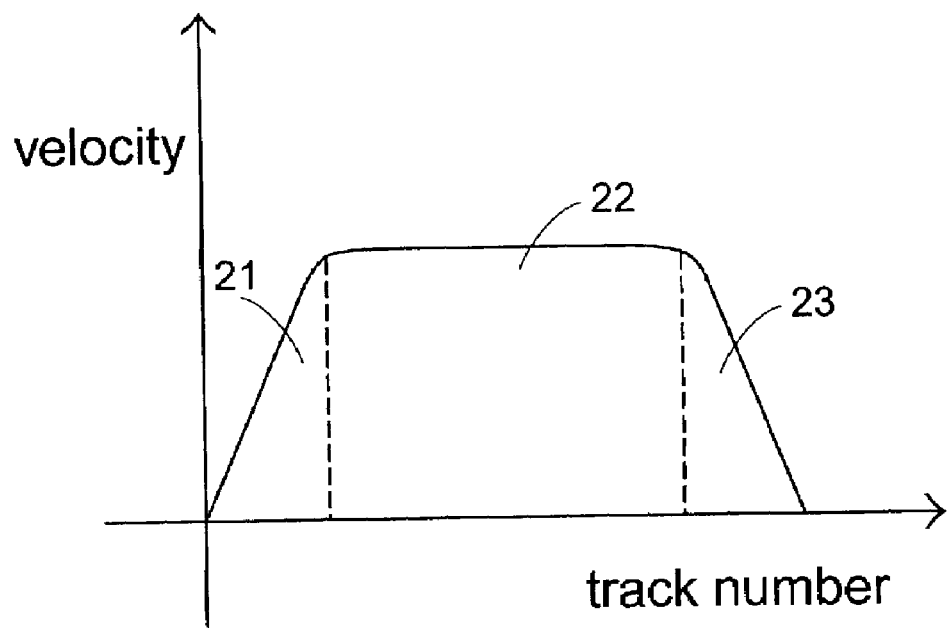
FIG. 2 is a plot schematically showing a velocity profile of an optical read/write head to perform a long seeking operation.
Figure 3:
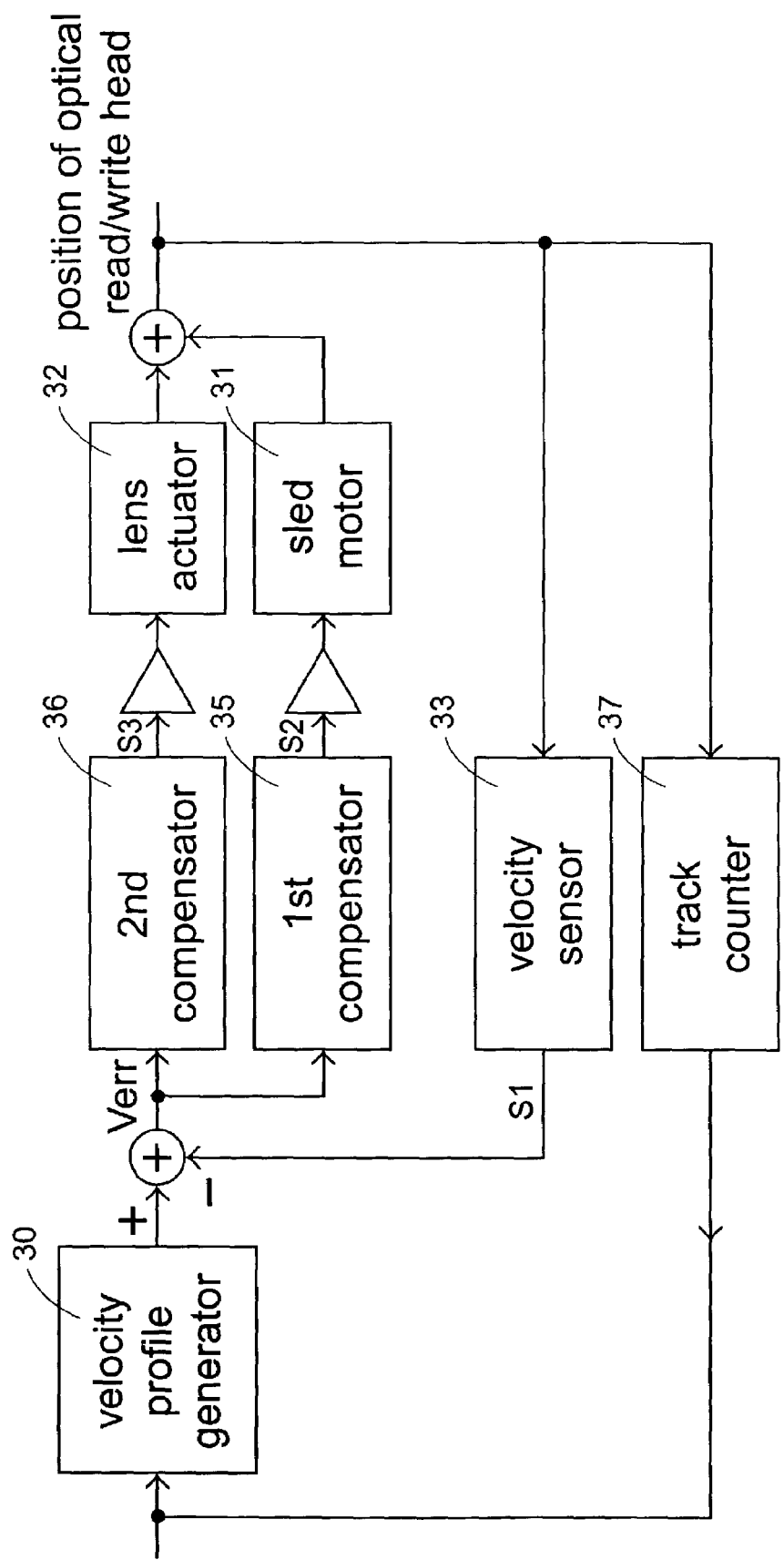
FIG. 3 is a circuit block diagram showing a conventional apparatus for long seeking control of an optical read/write head.
Figure 4:
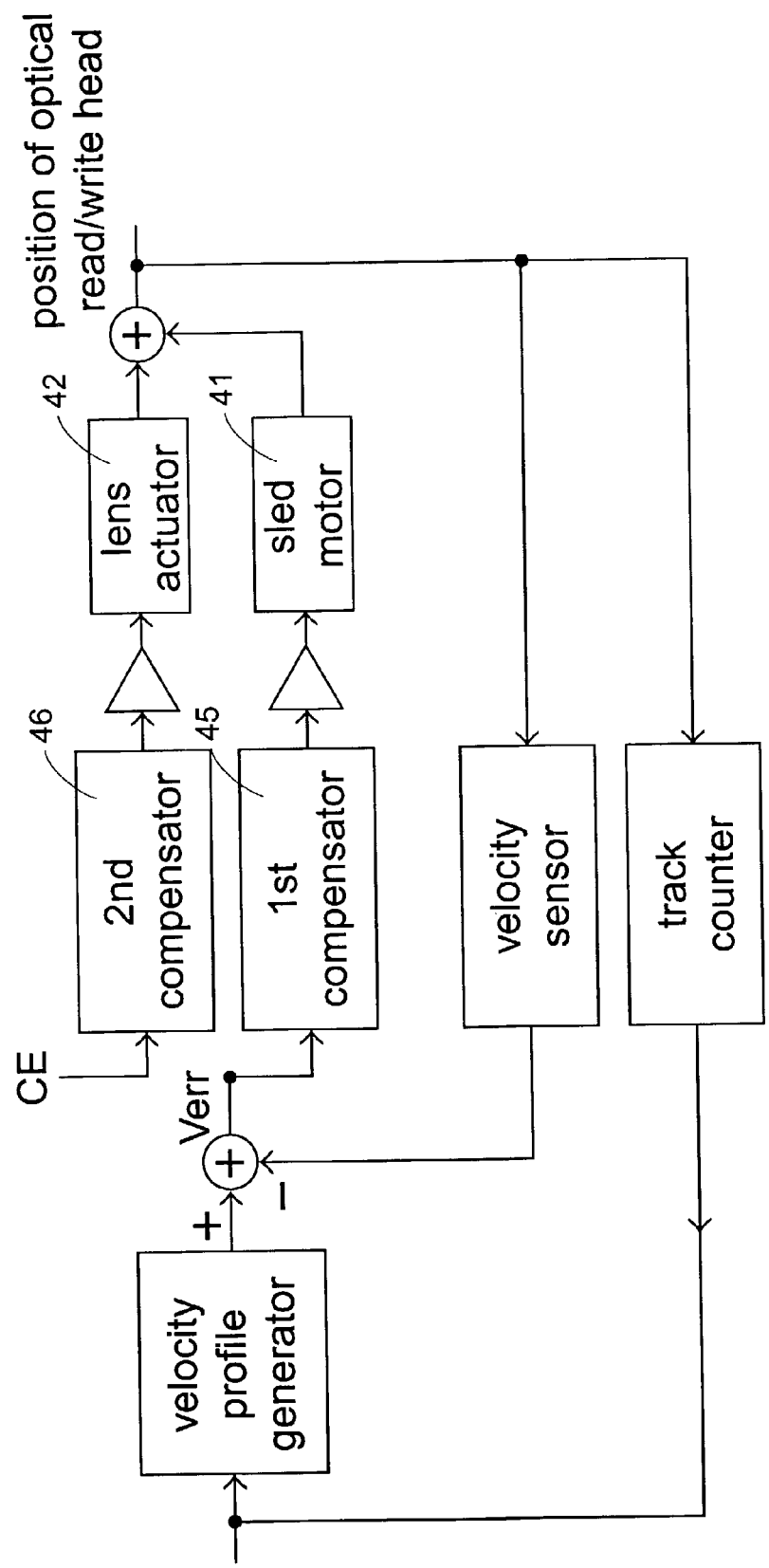
FIG. 4 is a circuit block diagram showing another conventional apparatus for long seeking control of an optical read/write head.
Figure 5:
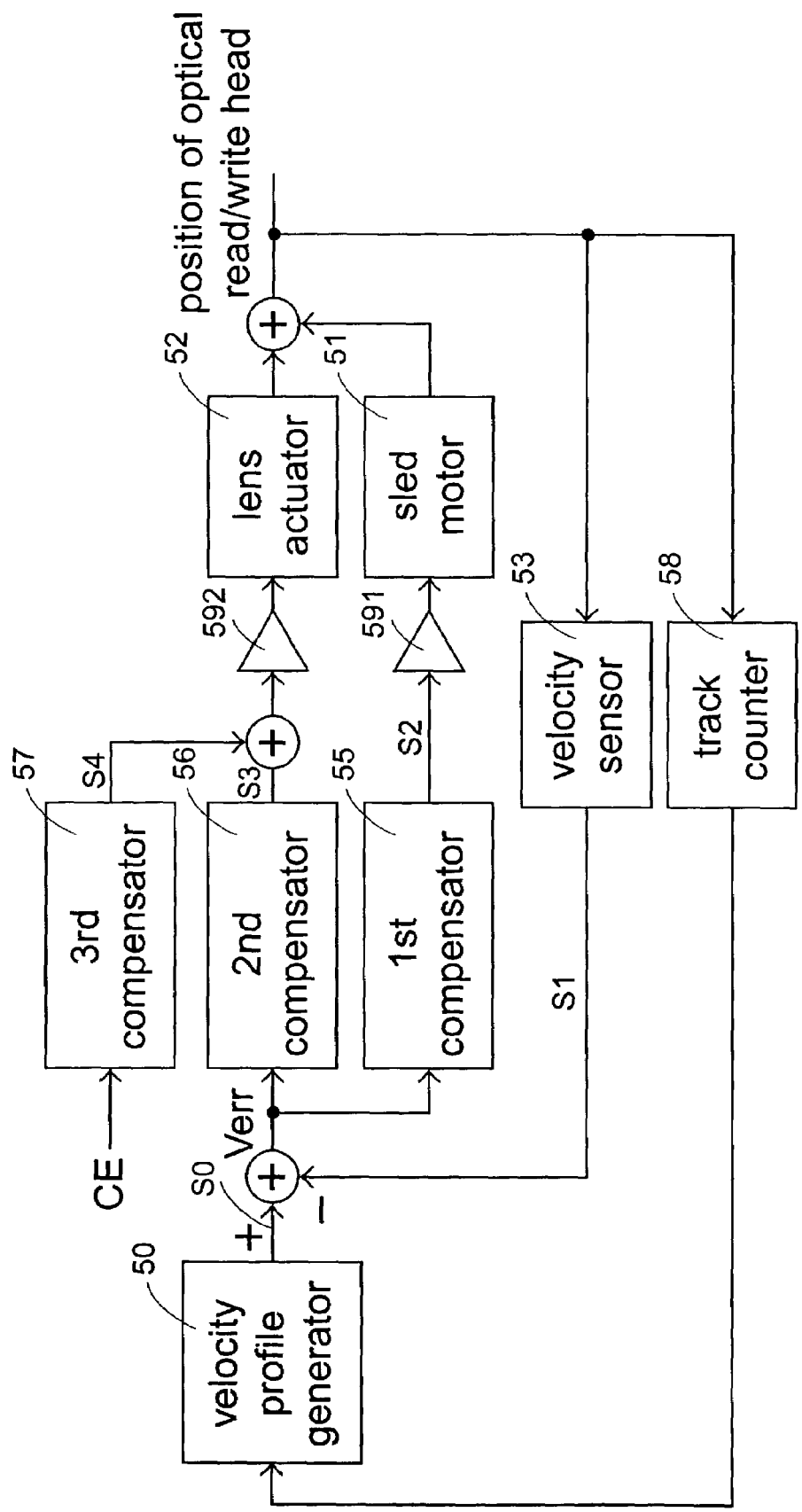
FIG. 5 is a circuit block diagram showing an apparatus for long seeking control of an optical read/write head according to the present invention.

Please refer to FIG. 5 which is a circuit block diagram showing an apparatus for long seeking control of an optical read/write head according to the present invention. The optical read/write head includes a lens which is carried by a sled to move relative to an optical disk to perform a read/write operation. The sled is moved by a sled motor for long-distance driving, and the lens is moved within the sled by a lens actuator such as an electromagnetic actuator for fine-tuning driving. For approaching the required velocity profile and properly positioning the lens, a stable and precise long seeking operation according to the present invention is performed by, at first, determining a target velocity of the optical read/write head according to a travel track number from a start position at a first time spot. Then, an instant velocity of the optical read/write head at the first time spot is detected. By comparing the instant velocity with the target velocity, a velocity error is realized. The velocity error is inputted to the sled motor to determine an output of the sled motor and also a position of the sled at a second time spot. The velocity error and a position error are further inputted to the lens actuator to determine an output of the lens actuator, and also a position of the lens at the second time spot.

The present apparatus includes a velocity profile generator 50, a velocity sensor 53, a first compensator 55, a second compensator 56, a third compensator 57, a track counter 58, a first amplifier 591 and a second amplifier 592 to perform velocity feedback control operation in response to the position of the optical read/write head, thereby dynamically adjusting the outputs of the sled motor 51 and the lens actuator 52. The velocity profile generator 50 generates a target velocity signal S0 in response to a track number of the optical read/write head from a start position. The actual passing number of tracks is determined by the track counter 58. Meanwhile, the velocity sensor 53 detects a relative velocity of the optical read/write head, and generates a detected velocity signal S1. The detected velocity signal S1 is mathematically operated with the target velocity signal S0 to obtain a velocity error signal Verr. The velocity error signal Verr is provided for both of the first and the second compensators 55 and 56. The first compensator 55, in response to the velocity error signal Verr, outputs a first control signal S2 to the sled motor 51 via the first amplifier 291 to modify the velocity of the sled. On the other hand; the second compensator 56, in response to the velocity error signal Verr, outputs a second control signal S3 to the lens actuator. In addition to the velocity error signal Verr, the lens actuator 52 is further effected by a third control signal S4 outputted by the third compensator 57 in response to a central error signal CE. Both of the second and third control signals are amplified by the second amplifier 592 prior to the input to the lens actuator 52. By using the first and second compensators 55 and 56 to adjust the velocities of the sled and the lens, respectively, it is advantageous to approximate the velocity error Verr to zero, and thus allow the velocity of the optical read/write head follow the desired velocity profile. Further, by using the third compensator 57 to center the lens on the sled, the data pickup lens can be aligned with the accessed track of the optical disk even when the optical disk has a relatively large eccentric rate and the access speed is relatively high. The long-seeking precision and stability of the read/write operation of the optical read/write head are thus confirmed.

It is understood that an optical read/write head is exemplified hereinbefore to illustrate the operation of the present long seeking control apparatus and method. The movement of other kinds of pickup heads can be controlled according to the present invention.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An apparatus for long seeking control of a pickup head, said pickup head being moved relative to an information storage means by a long-distance driving device and a fine-tuning driving device, and said apparatus for long seeking control of a pickup head comprising:
   a velocity profile generator generating a target velocity signal in response to a pickup head seeking movement;
   a velocity sensor for detecting a velocity of said pickup head to generate a velocity error signal;
   a first compensator electrically connected to said long-distance driving device, and outputting a first control signal to said long-distance driving device in response to said velocity error signal to modify a velocity of said pickup head by a first level;
   a second compensator electrically connected to said fine-tuning driving device, and outputting a second control signal to said fine-tuning driving device in response to said velocity error signal to modify a velocity of said pickup head by a second level; and
   a third compensator electrically connected to said fine-tuning driving device, and outputting a third control signal to said fine-tuning driving device to corresponding said pickup head to said information storage means in a predetermined manner.

2. The apparatus according to claim 1 wherein said pickup head is an optical read/write head, and said information storage means is a compact disk (CD).

3. The apparatus according to claim 2 wherein said optical read/write head includes a sled carrier moved by said long-distance driving device and a data pickup lens moved by said fine-tuning driving device.

4. The apparatus according to claim 3 wherein said long-distance driving device is a motor, and said fine-tuning driving device is an electromagnetic actuator.

5. The apparatus according to claim 2 further comprising a track counter electrically connected to said velocity profile generator for recording said track count, and generating a counting signal to said velocity profile generator.

6. The apparatus according to claim 2 wherein said predetermined manner is substantially centering said data pickup lens on said sled carrier while encountering with tracks of said information storage means.

7. The apparatus according to claim 1 wherein said velocity error signal is obtained by comparing a velocity signal detected by the velocity sensor with said target velocity signal.

8. The apparatus according to claim 7 wherein said velocity error signal is a difference of said detected velocity signal and said target velocity signal, and a combination of said first and said second levels of modification approximates a value of said velocity error signal to zero.

9. The apparatus according to claim 1 further comprising:
   a first amplifier electrically connected to said first compensator and said long-distance driving device for amplifying said first control signal prior to input into said long-distance driving device; and
   a second amplifier electrically connected to said second and said third compensators and said fine-tuning driving device for amplifying said second and said third control signals prior to input into said fine-tuning driving device.

10. An apparatus for long seeking control of a pickup head, said pickup head including a carrier moved by a long-distance driving device, and a data pickup element mounted on said carrier and moved by a fine-tuning driving device, said apparatus for long seeking control of a pickup head comprising:
   a velocity profile generator generating a target velocity signal in response to a pickup head seeking movement;

a velocity sensor for detecting a velocity of said pickup head to generate a velocity error signal;

a first compensator electrically connected to said long-distance driving device, and outputting a first control signal to said long-distance driving device in response to said velocity error signal to modify a velocity of said carrier;

a second compensator electrically connected to said fine-tuning driving device, and outputting a second control signal to said fine-tuning driving device in response to said velocity error signal to modify a velocity of said data pickup element; and a third compensator electrically connected to said fine-tuning driving device, and outputting a third control signal to said fine-tuning driving device to substantially center said data pickup element on said carrier.

11. A method for long seeking control of a pickup head, said pickup head including a carrier moved by a long-distance driving device, and a data pickup element mounted on said carrier and moved by a fine-tuning driving device, and said method comprising steps of:

determining a velocity profile according to a movement distance of said pickup head;

detecting an instant velocity and an instantaneous position of said pickup head at a certain time spot;

comparing said instant velocity with a target velocity corresponding to said instantaneous position according to said velocity profile; and dynamically adjusting a position of said data pickup element in said carrier according to the comparing result of said instant velocity with said target velocity and the relative positions of said data pickup element and said carrier.

12. The method according to claim 11, further comprising a step of modifying velocities of said carder and said data pickup element according to the comparing result of said instant velocity and said target velocity.

13. The method according to claim 11 wherein said pickup head is an optical pickup head.

14. The method according to claim 11 wherein said position of said data pickup element is adjusted by being centered on said carrier.

15. A method for long seeking control of a pickup head, said pickup head including a carrier driven by a long-distance driving device, and a data pickup element mounted on said carrier and driven by a fine-tuning driving device to move relative to a data carrying object, and said method comprising steps of:

determining a target velocity of said pickup head according to a travel unit number from a start position at a first time spot;

detecting an instant velocity of said pickup head at said first time spot; comparing said instant velocity with said target velocity to realize a velocity error;

inputting said velocity error and a position error to said fine-tuning driving device to determine a position of said data pickup element at a second time spot.

16. The apparatus according to claim 15 wherein said pickup head is an optical pickup head, and said information storage means is a compact disk (CD).

17. The method according to claim 15 wherein said position error is a central error which controls said data pickup element to be centered on said carrier.

18. The method according to claim 15, further comprising a step of inputting said velocity error to said long-distance driving device to determine a position of said carrier at said second time spot.

* * * * *